United States Patent [19]

Kane

[11] Patent Number: 4,716,771
[45] Date of Patent: Jan. 5, 1988

[54] SYMMETRICAL MASS FLOW METER
[75] Inventor: Martin Kane, Atlantic City, N.J.
[73] Assignee: K-Flow Division of Kane Steel Co., Inc., Millville, N.J.
[21] Appl. No.: 809,659
[22] Filed: Feb. 11, 1986
[51] Int. Cl.$^4$ .............................................. G01F 1/84
[52] U.S. Cl. .................................................. 73/861.38
[58] Field of Search .............. 73/32 A, 861.37, 861.38
[56] References Cited

U.S. PATENT DOCUMENTS

Re. 31,450 11/1983 Smith .
2,624,198 1/1953 Pearson .
2,811,854 11/1957 Powers .
2,813,423 11/1957 Altfillisch et al. .
2,819,437 1/1958 White .
2,821,084 1/1958 Altfillisch et al. .
2,831,349 4/1958 Altfillisch et al. .
2,834,209 5/1958 Jones et al. .
2,865,201 12/1958 Roth .
3,087,325 4/1963 Roth .
3,108,475 10/1963 Henderson .
3,132,512 5/1964 Roth .
3,218,851 11/1965 Sipin .
3,261,205 7/1966 Sipin .
3,273,257 10/1966 Roth .
3,329,019 7/1967 Sipin .
3,355,944 12/1967 Sipin .
3,396,579 8/1968 Souriau .
3,456,491 7/1969 Brockhaus .
3,485,098 12/1969 Sipin .
3,896,619 7/1975 Hunter et al. .
3,927,565 12/1975 Pavlin et al. .
4,109,524 8/1978 Smith .
4,127,028 11/1978 Cox et al. .
4,187,721 2/1980 Smith .
4,192,184 3/1980 Cox et al. .
4,252,028 2/1981 Smith et al. .
4,311,054 1/1982 Cox et al. .
4,381,680 5/1983 Shiota .
4,422,338 12/1983 Smith .
4,444,059 4/1984 Smith .
4,470,294 9/1984 Hamel .
4,491,009 1/1985 Ruesch .
4,491,025 1/1985 Smith et al. .
4,559,833 12/1985 Sipin .
4,628,744 12/1986 Lew .
4,655,089 4/1987 Kappelt et al. .

FOREIGN PATENT DOCUMENTS 3230445 2/1984 Fed. Rep. of Germany ... 73/861.38
149900 11/1961 U.S.S.R. .
146982 3/1964 U.S.S.R. .
732672 5/1980 U.S.S.R. ........................... 73/861.38

OTHER PUBLICATIONS

Alan M. Young–"Coriolis–Based Mass Flow Measurement".
F. Dahlin, A. Young, R. Blake, C. Guggenheim, S. Kaiser and A. Levien–"Mass Flowmeter".
W. Bye–"Mass Flow Measured with Vibration Generators".
Danfoss Co., "MASSFLOW".
Exac Corp., Digital Precision Mass Flow Meter.
Smith Meter Co., "S–MASS", 1985.
Micro Motion, Model D25.
Instrument Engineers Handbook (Rev. Ed.) Mass Flow Meters (pp. 87–90), 1982.

Primary Examiner—Herbert Goldstein
Attorney, Agent, or Firm—Seidel, Gonda, Goldhammer & Abbott

[57] ABSTRACT

A symmetrical mass flow meter for placement within a defined fluid stream or pre-existing pipe line which defines an axial line. The flow meter including a single conduit tube which forms two substantially symmetrical and free floating loops between the inlet and the outlet of the flow meter. The flow meter conduit directs the fluid through the first loop and crosses the axial line substantially perpendicular to this line. The second loop directs the fluid from the crossing point and returns it into the defined fluid stream. The conduit is deflected perpendicular to the direction of flow at the crossing of the axial line along the axial line. Sensors are positioned on the periphery of each loop to measure the Coriolis reaction force created by the fluid in response to the central deflection of the conduit. The reaction forces are measured without reference to a specific axis of rotation or a fixed position. External vibrational effects on the sensor measurement unrelated to the Coriolis reaction forces are physically and electronically minimized by the conduit design.

19 Claims, 12 Drawing Figures

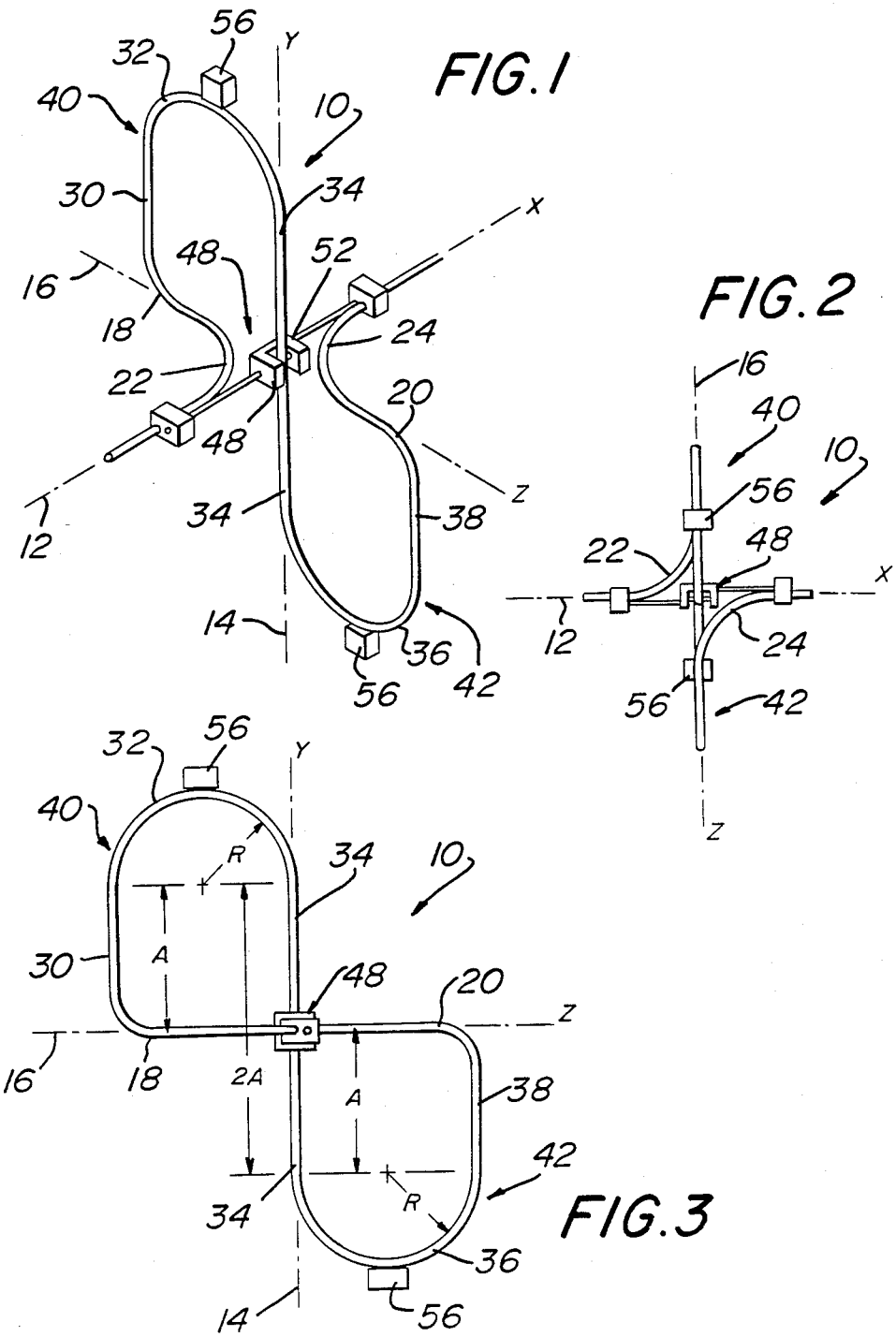

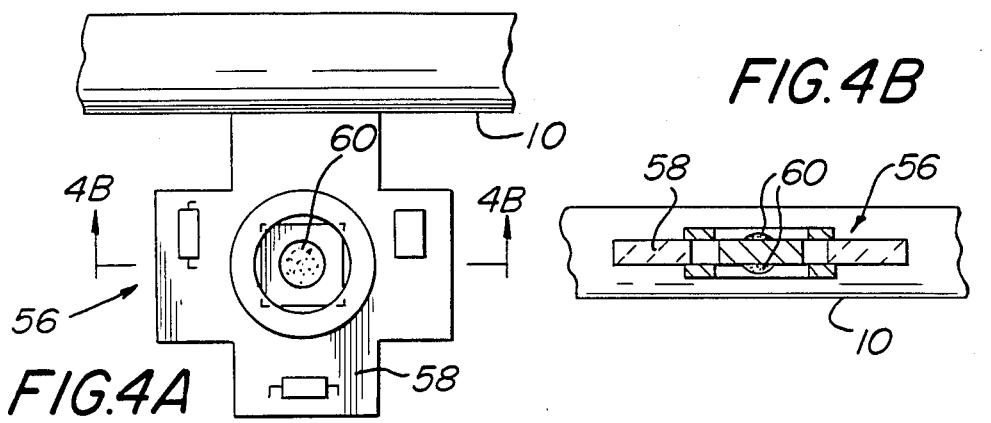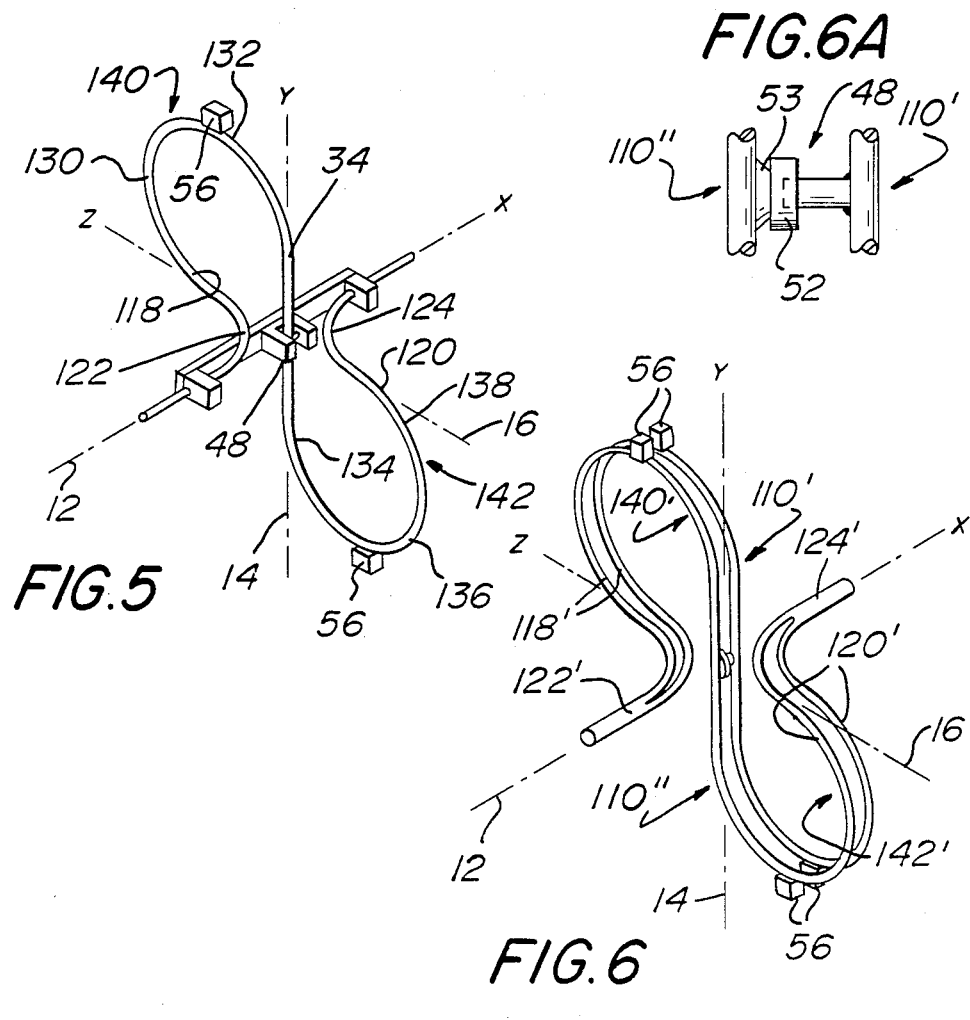

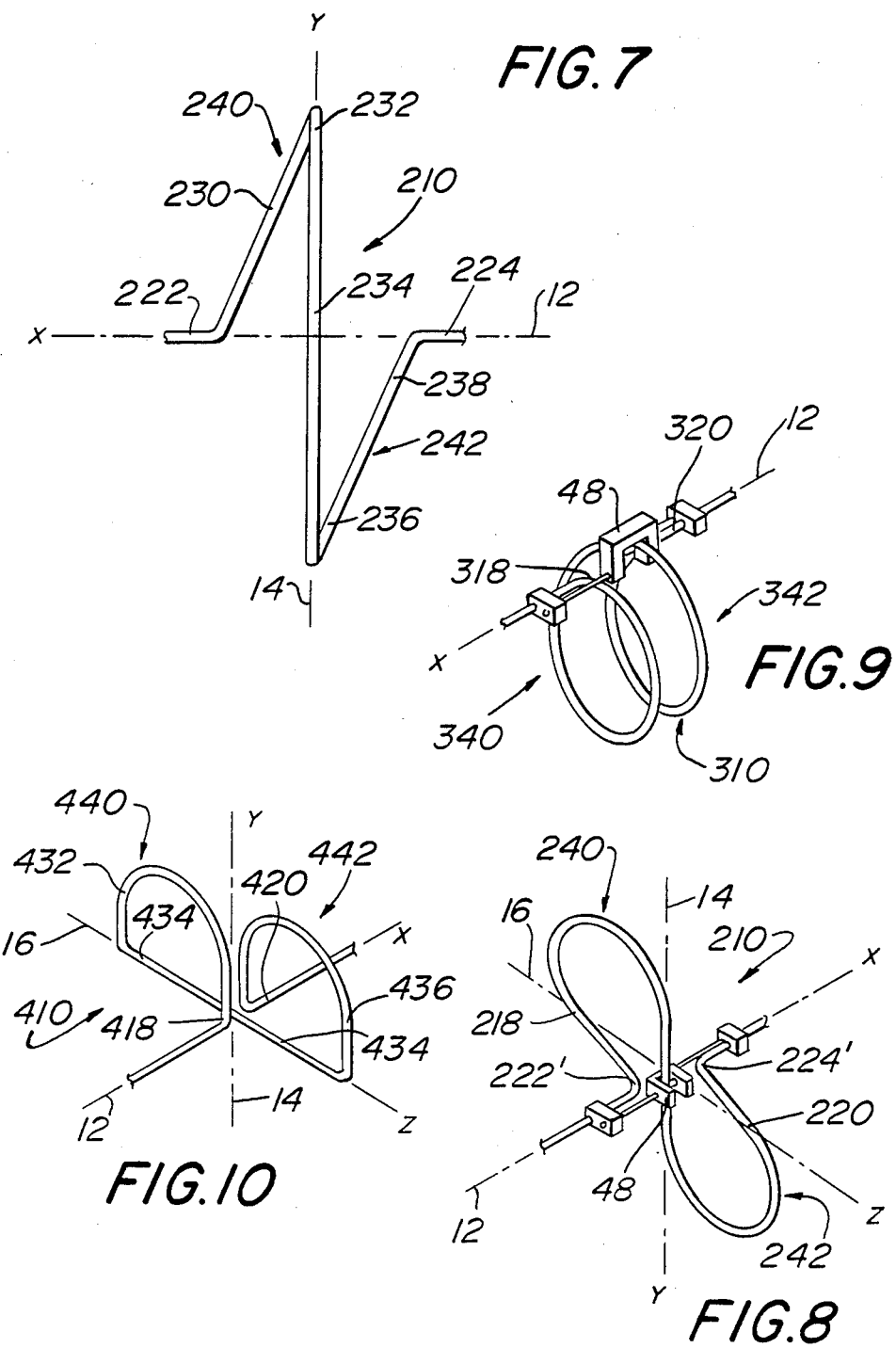

SYMMETRICAL MASS FLOW METER

BRIEF SUMMARY OF THE INVENTION

This invention relates to the measurement of mass flow within an existing or defined fluid stream by the use of what is known as a Coriolis flow meter. Typically, Coriolis type flow meters comprise a tube or conduit which is oscillated in an alternating mode, transverse to the flow within the tube. The transverse oscillation of the tube causes a repetitive reaction force by the fluid against the tube in opposite directions on opposite sides of the applied transverse vibration. The repetitive reaction of the tube can be correlated to the mass flow rate within the tube. This type flow meter should be compared to the simple torsional bending of a tube created by a rotational or DC mode system.

Various conduit designs have been proposed in order to measure the mass flow by this Coriolis method. Sipin in U.S. Pat. No. 3,329,019 teaches a linear or straight tube design which directly measures the force of the reaction couple caused by the fluid. Further Sipin U.S. Pat. Nos. 3,355,944 and 3,485,098, disclose the transverse oscillation of a tube having a curvature within the line of flow. This design variation (over the '019 patent) is intended to increase the measurability of the reaction force couple. The curvature of the tube in these two later patents is restricted to a maximum of 180°, such that the fluid within the flow meter does not reverse its direction of flow in the line of the fluid stream. Additionally, the curved portion of the tube is essentially cantalevered such that oscillation of the tube causes an effective partial rotation of the curved end of the tube about a fixed axial line (e.g. the line defined by the fluid stream).

In Cox et al., U.S. Pat. No. 4,127,028, the curvature of the tube is increased over the 180° limitation of Sipin '098 with reversals in the direction of flow being desired. Cox increases the deflection arm of the opposite reaction forces on the tube about the position of the oscillatory motion to increase the measurability of the tube deflection. Additionally, Cox intendeds to utilize the resonant frequency of the vibrating tube to limit unwanted vibrational influences during the sensing of the reaction force against the tube. The Cox tube is cantalevered (similar to the '944 and '098 patents) about a, desirably, fixed rotational axis.

The Cox patent ('028) recognizes that noise created by the mechanical oscillation of the tube and other external vibrational influences greatly effect the sensitivity of the flow meter. To limit the effect of these unwanted vibrational influences, Cox teaches a second identically curved cantalevered tube which is provided adjacent to the first tube. The second tube is oscillated in the opposite vibrational mode from the first tube. The intent being that, since the identical tubes vibrate at substantially the same resonant frequency, the external vibrational effects on the reaction force sensing should be self-cancelling.

A number of more recent patents propose various structural changes over the Cox '028 designs for producing a similar effects as the dual tube of this patent. These further developments in flow meters of this type include the use of velocity-type sensors to measure the phase difference between the repetative reaction on the opposite sides of the imparted oscillation. (See Roth U.S. Pat. No. 3,087,325.) Additionally, in Cox et al., U.S. Pat. No. 4,192,184, velocity sensors are used on the dual tube design similar to that disclosed in the '028 patent. In Smith, U.S. Pat. No. 4,422,338, velocity sensors are used in conjunction with linear sensors for measurements of a single cantilevered U-shaped tube. The velocity sensors vary the position of the reference or zero plane of the tube to eliminate vibrations unrelated to the reaction force couples from the measurements.

The sensing of the tube reaction in all of the designs in the above referenced patents is affected by external mechanical vibrations of the tube. These vibrational influences are created by the tube oscillation means, the machinery within the process line and other external environmental influences. Most of these flow meter designs use cantilevered tubes having a fixed spring constant which resists the bending or motion of the tube due to the fluid reaction force. This cantalevered tube is oscillated about a, supposedly, fixed rotational axis. However, the internal and external vibrational influences affect the positioning of this axis such that the reference line of the sensors is not fixed during sensing. These sensor reference fluctuations greatly affect the sensitivity of this type mass flow measurement.

Commonly assigned, copending U.S. application No. 809,658 titled "Mass Flow Meter" teaches a flow meter tube formed into a loop which is spiraled about the axis of the fluid stream. The direction of the imparted oscillation to this loop is substantially parallel to the axial line. Thus, the deflection are imparted into a transverse plane with respect to the piepline of the defined fluid stream and not transverse to the flow within the pipeline. The transverse oscillation imparted to the flow meter tube causes only the reaction force couples on this tube and does not substantially effect the flow in the defined fluid stream. Another improvement proposed by this copending application is the measurement of the fluid reaction on the flow meter tube without reference to a specific rotational or fixed axis. Additionally, the spiraled loop is substantially free floating and, thus, has a significantly reduced spring constant, which increases the sensitivity of the meter.

It should be appreciated that as long as there is an increase in the effective transverse velocity of the fluid from the entrance of the flow meter tube to a point of maximum velocity (at the oscillation or deflection means) and a decrease in the transverse velocity gradient from the maximum point to the outlet of the flow meter, there should be a transverse reaction force in one direction on the inlet portion of the flow meter tube and in an opposite direction on the outlet portion of the flow meter tube. This principle is described in Sipin '019 for a vibrating straight tube and in Sipin '098 for a U-shaped tube.

Assuming that the point of maximum transverse velocity is the mid-point of the flow meter tube (and the point of oscillation), the inertial reaction of a single fluid particle to the oscillatory motion on the flow meter tube in the transverse direction will decrease from the inlet of the conduit while approaching this maximum point from the input end of the flow meter conduit. This reaction force will be directed in the negative direction between this midpoint and increase in magnitude to a maximum (or effectively decrease since it is in the relatively negative direction) as it approaches the outlet of the conduit. In flow meter tubes which have reversals in the direction of flow, the transverse reaction of the fluid particle will reach a maximum magnitude at symmetrically located positions on opposite sides of the maximum vibration point along the input and output legs of the tube. The integrated reaction force due to the combined reaction of all fluid particles between the tube entrance and its mid-point can be expressed as a single reaction force, as can the integrated force due to the deceleration of the fluid particle between the midpoint and the outlet. These resulting reaction forces create an oscillating motion of the tube which is measured as an indication of the fluid mass flow.

The nature of the motion of the tube due to the reaction of the fluid in the direction perpendicular to the axial line on either side of the mid-point is not necessarily material to the determination of the mass flow within the tube since the integrated force is a point force and proportional to the maximum value of the transverse velocity and not the velocity gradient (unlike the case for an elementary particle).

Additionally, the location of this resulting reaction force is not necessarily required since the relative reaction of the input and output legs of the flow meter conduit are to be sensed rather than measuring the actual magnitude of this deflection. However, the point of maximum Coriolis reaction is the ideal location for the reaction force sensor since the magnitude of the reaction force will be easier to separate from other external vibrations being sensed at this location on the tube.

SUMMARY OF THE INVENTION

A preferred embodiment of the present invention includes a flow meter conduit which is centrally driven directly along the axial line of the pre-existing defined fluid stream. A loop or couple arm is formed for both the incoming and outgoing fluid flow with each loop symmetrical about a central oscillatory means. The loops are not cantilevered with respect to any specific fixed rotational axis and are, each, substantially free-floating, i.e., substantially free of restrictions of constraints along its length. The sensing of the fluid reaction force on each loop is made independently. Preferably, each loop provides a large deflection arm with respect to the point of central oscillation.

Deficiencies in known flow meter designs relate to their sensing technique and the effect of the vibrational influences on the reaction force measurement. The present invention drives the flow meter conduit directly along the line of the defined fluid stream of the existing piping system. Additionally, the fluid reaction force against the flow meter conduit is preferably sensed without reference to a specific axis of rotation. The conduit is, also, substantially free-floating and has effectively reduced the spring constant of the tube and the resistance of the conduit in responding to the fluid reaction force. All of these factors act to increase the sensitivity of the mass flow measurement in the present invention.

The preferred embodiment of this invention includes a conduit or tube which is placed within the line of a defined fluid stream. The first loop of the conduit is formed with its outlet crossing this axial line, substantially perpendicular thereto. The inlet into the loop redirects the flow of the stream 90° with respect to the axial line. The inlet portion of the conduit redirects the flow approximately 180° relative to at least two planes which are perpendicular to this axial line. An outlet portion of the flow meter conduit, beginning at the outlet of the first loop or the crossing point of the conduit with the axial line, redirects the flow similar to that of the inlet portion, only in mirror image, such that the flow returns into of the pre-existing pipeline of the defined fluid stream. The second loop of the flow meter conduit and the outlet portion of the flow meter are substantially identical in size and shape to the first loop and inlet portion of the conduit. The two loops are, preferably, positioned symmetrically about the center point of the meter (or crossing point of the axial line). An oscillating driver is positioned at the axial crossing and between the two loops. The driver imparts a deflection to the conduit which is substantially perpendicular to the flow at this point. This imparted oscillation is, also, directed substantially along the axial line of the pre-existing pipeline and at the most rigid point with respect to the defined fluid stream. Thus, the effect of this oscillation on the fluid flow up and down the stream from the flow meter is substantially eliminated.

Each loop is provided with at least one sensor or pick-up which independently measures the oscillatory motion of its corresponding loop due to the transverse acceleration of the fluid created by the driver motion. The phase differential of the deflection of each loop due to the opposite reaction force gradients is the preferred reference characteristic of the sensors. The preferred sensor is a piezo self-referencing transducer which is an accelerometer-type sensor. This type sensor converts the mechanical vibratory energy of the tube into a electrical pulse where the relative motion becomes proportional to the acceleration of the tube. The piezo transducer is generally used together with a low pass filter to electrically eliminate unwanted vibrational frequency components. This type transducer may also be directly mounted to the tube wall at the point of maximum deflection of each loop and does not require a pre-set reference to any specific fixed position of the loop. Thus, the output of the sensor is related only to the oscillatory motion of the loop created by the fluid reaction force.

By driving the conduit at a central point between the loop and along the axial line of the existing fluid stream the effect of the driver on the sensativity of the flow meter is substantially increased. Additionally, the vibratory effect on the fluid flow by the driver oscillation is substantially eliminated up and down stream from the flow meter. This elimination is because the driver motion is directly along the line of the fluid stream and not perpendicular thereto.

By positioning the sensors on a substantially freefloating loop without requiring a fixed reference location, the loop motion may be sensed without the inclusion of errors related to vibrations of a fixed reference position. The vibrational effects on the flow meter conduit not related to the fluid reaction force are substantially eliminated from the sensor output by this invention. The use of accelerometer-type sensors provide a means for rejection of unwanted noise in the conduit reaction measurements since signals which do not represent deflection due to the fluid reaction may be electronically eliminated. By reducing the unwanted vibrational effects on the flow meter conduit measurements, the accuracy and sensitivity of the flow meter is substantially increased.

"In line" mounting of the transversely placed flow meter conduit brings the inlet and the outlet of the flow meter closer together. This structure substantially reduces the size of the meter castings, such as its cover and mounting brackets. Also, the portion of the process line which is displaced by the flow meter is minimized.

Additionally, since the flow meter is symmetrical about its center position, the center of gravity of the meter does not effect its motion in response to the reaction forces.

Further objects and advantages of this invention will become apparent to those skilled in the art by particularly pointing out and describing the preferred embodiments of this invention. For the purpose of illustrating the invention, there is shown in the drawings a number of forms which are presently contemplated; it being understood, however, that this invention is not limited to the precise arrangements and instrumentalities shown.

BRIEF DESCRIPTION OF THE DRAWINGS

FIG. 1 shows a perspective view of one embodiment of the invention with reference to an axial coordinate system.

FIG. 2 shows a top view of the embodiment shown in FIG. 1.

FIG. 3 shows a front view of the embodiment in FIGS. 1 and 2 with reference to dimensional parameters.

FIGS. 4a and 4b show an enlarged view of the preferred sensor embodiment utilized in the invention.

FIG. 5 shows a perspective view of a second embodiment of the invention.

FIG. 6 shows a dual tube variation of the embodiment of the invention.

FIG. 6a shows a partial view of the flow meter tube shown in FIG. 6.

FIG. 7 shows a side view of an additional embodiment of the invention.

FIG. 8 shows a perspective view of the embodiment shown in FIG. 7.

FIG. 9 shows a perspective view of an additional embodiment of the contemplated invention.

FIG. 10 shows a perspective view of an additional embodiment of the invention.

DETAILED DESCRIPTION OF THE DRAWINGS

In the first embodiment of the invention as shown in FIGS. 1, 2, and 3 the flow meter conduit is referred generally to by the reference numeral 10. The flow meter 10 is positioned substantially along the axial line formed by the existing pipe line or defined fluid stream. This axial line will be generally referred to as the X-axis 12. The vertical or Y-axis in the drawings will be referred to by the reference numeral 14 and the Z-axis will be referred to by the reference numeral 16. This coordinate reference system is particularly shown in the perspective view in FIG. 1 with respect to this first embodiment.

The conduit 10 has an inlet 18 and an outlet 20 which are positioned substantially on the Z-axis 16 or within the plane formed by the Y-axis 14 and the Z-axis 16. The connection to the conduit 10 from the defined fluid stream to the inlet 18 and from the outlet 20 to the defined fluid stream is made through connecting portions 22 and 24, respectively.

Beginning at the inlet 18, the flow meter conduit 10 generally forms an inverted S-shape, when viewed perpendicular to the Y-Z plane and substantially defines two loops or deflection arms (see FIG. 3). The first loop 40 of the conduit 10 extends from the inlet 18 through an inlet arm portion 30, curves through a first radial portion 32 and extends through a central arm portion 34. The central arm portion 34 passes through the X-axis 12, crossing substantially perpendicular to this axis, such that the flow within the conduit 10 is perpendicular to the X-axis 12 at this crossing. Central arm poriton 34 connects to a second radial portion 36 which in turn connects to an outlet 20 through an outlet arm poriton 38. These portions of the conduit 34, 36 and 38 define the second loop 42.

The relative length of central arm poriton 34, as can be seen in FIG. 3, is preferably twice the length of the inlet arm portion 30 or outlet arm poriton 38 of either the first 40 or second loop 42. This design minimizes the size of the flow meter and reduces the spring constant of the flow meter conduit as compared to known designs. It should be noted that each of these portions may be varied in length considering the properties of the fluid within the flow meter conduit 10. The diameter of the tubing of the conduit and its construction material will also vary depending on the temperature, pressure and fluid in the stream. The first loop 40 and the second loop 42 are substantially identical such that the flow meter is symmetrically about the X-axis 12 and the crossing point of this axis. Additionally, in this first embodiment (FIGS. 1-3) the conduit 10 from the inlet 18 to the outlet 20 is substantially formed within a single plane which is defined by the Y-axis 14 and the Z-axis 16.

Since the flow of the pre-existing defined fluid stream is substantially along the X-axis 12 the flow into and out of the flow meter conduit 10 must be deflected away from the X-axis 12 to connect with the inlet 18 or outlet 20 which are positioned along the Z-axis 16. This deflection of the flow is performed by connecting portions 22 and 24 which are positioned on respectively opposites sides of the X-axis 12 for connection to the inlet 18 and the outlet 20. These connecting portions 22, 24 direct the fluid flow into the first loop 40 which directs it in substantially a circular fashion through the X-axis 12 and returns it from the second loop 42 to the outlet 20, returning then to the defined fluid stream.

The preferred embodiment of the driver 48 is a mechanical feedback multivibrator which operates at the resonant frequency of the mass being driven. The driver generally comprises a bar magnet which is attached to the flow meter conduit 10 (in FIGS. 1-3). The driver 48 in all embodiments shown deflects the flow meter conduti substantially along the X-axis 12. An opposing current coil is positioned on either side of the conduit 10 for alternately attracting and repelling the bar magnet to cause the desired vibratory motion of the conduit 10 at the mid-point or X-axis 12 crossing. In typical circuitry for the driver, a MOSFET bridge drives the coil which in turn drives the magnets and the conduit 10. Conventional coil accelerometer feedback or a combination of piezo/coil or a piezo/crystal may be used to eliminate some of the electomagnetic common mode noise created by the driver 48 which may effect the sensor and the flow rate determination.

Shown in FIG. 4a and 4b is a mechanical section of the preferred embodiment of the sensor 56. This type sensor 56 is generally known as an accelerometer and consists of a ceramic piece 58 having a film or surface mounted center positioned mass 60. This sensor 56 can be attached directly to the conduit tube 10 onto each of the loops or may be positioned by means of a mechanical clip (not shown). Thin, typically, capton encapsulated wires are hung from the flow meter tube 10 and are attached to the electronics box (not shown) of the flow meter to provide the electrical signals from the sensor 56.

Since mechanical noise effects the sensing of the fluid reactions on the conduit 10, it is desirable to include a means for producing a sensor signal having a narrow band so that unwanted electrical noise caused by the vibration of the driver or other external influences may be eliminated easily from the signal. This vibrational reaction will be in addition to a differential noise cancellation between the sensors 56 and the driver 48. Narrow band filters may be used along with the output of the piezo X-tal preamp, on which is mounted the central mass 60, being very tightly meshed in characteristics and physically tied together with the sensor for temperature tracking so that any phase shift of the filters will be substantially identical to that of the sensors. Therefore, the integrity of the desired mechanical phase shift is maintained.

The vibrations of the driver 48 create an increase in the transverse momentum of the fluid which causes a reaction force against the conduit wall 10. This reaction force creates a motion of the loops 40 or 42. The sensors 56 are positioned on opposite sides of the central oscillation of the driver 48 to record this loop motion. The sensors 56 produce serial information related to each loop's motion which may be correlated in a microprocessor in any convenient manner to provide an accurate determination of the corresponding mass flow rate.

The embodiment of the flow meter conduit 110 shown in FIG. 5 is a variation of the inverted "S" form shown in FIGS. 1-3. This conduit 110 substantially forms a figure "8" design such that the inlet arm portion 130 and the outlet arm portion 138 are formed in a radial fashion similar to their respective radial portions 132 and 136. In this embodiment the inlet connecting portion 122 and outlet connecting portion 124 will still deflect the fluid stream away from the X-axis 12 prior to joining with the inlet 118 and outlet 120 which are positioned along the Z-axis 16.

The embodiment shown in FIGS. 7 and 8 include an offset of the flow meter conduit 210 away from the single plane defined by the Y-axis 14 and the Z-axis 16. The inlet 218 and the outlet 220 are positioned at a point adjacent to the X-axis 12 and are connected through an inlet bend 222 and an outlet bend 224, respectively, to position the inlet 18 and the outlet 20 away from the Z-axis 16.

In FIG. 6 a dual tube design is shown. The conduit 110' form is basically the same as that shown in FIG. 5 except that a second, adjacent conduit 110" is provided. Inlet bend portion 122 divides the flow from the defined fluid stream into the two conduits while outlet bend portion 124' converges the flow from the outlets 120' of the two conduits into the pipeline of the defined fluid stream. Sensors 56 may be utilized to measure the deflection of each conduit 110' and 110" individually or may measure the comparative motion of the adjacent loops 140' and 142' of each conduit to determine the deflection signature.

FIG. 6A shows a partial view of the embodiment in FIG. 6 including its driver 48. The two adjacent conduits 110' and 110" are, preferably, used as a mounting reference for the coil 52 and bar magnet 50 of the driver 48. This structure shows the coil 52 mounted to conduit 110' by bracket 53. The bar magnet 50 is attached to the adjacent conduit 110" at one end and positioned within the coil 52 windings at its opposite end. When the coil 52 is excited in the alternating mode, the two conduits will be alternatly repelled or attracted to one another (depending on the mode of the coil). Thus, the direction of drive oscillation is opposite in each conduit at any one point in time. Therefore, the corresponding deflections of the loops 140' and 142' of each conduit will be opposite to its adjacent loop. Therefore, the sensed deflection will be essentially twice that of a single tube design. Dual tube deflection and sensing are discussed in Cox et al, U.S. Pat. No. 4,127,028 and Smith et al, U.S. Pat. No. 4,491,025.

In FIG. 9 an alternate embodiment of the invention is shown having two substantially circular or oval shaped loops 340, 342 positioned adjacent to one another. The loops are substantially parallel with their central connection point provided along the X-axis 12. The driver 48 is positioned at this central point. The reaction forces of the fluid causing motion of each loop are sensed individually on each loop with the comparative signature information being correlated substantially the same as in previous designs.

In the embodiment of FIG. 10, a symmetrical conduit flow meter 410 is formed where the loops 440 and 442 are not formed in a circular or oval shape. In this particular design, the inlet bend and outlet bend portions utilized in the previously discussed conduit designs are not required. The flow meter attaches at the inlet 418 and directly deflects the flow of the fluid in a direction perpendicular to the X-axis. A first radial portion 432 arcs from the inlet 418 position to a point substantially along the Z-axis 16. A central arm portion 434 extends substantially along the Z-axis 16 crossing the X-axis 12 substantially perpendicular thereto. A second radial portion 436 arcs to return the flow towards the X-axis 12. The outlet 420 is positioned along the X-axis 12 at a position away from the Z-axis 16 and return the flow into the defined fluid stream.

Many variations on the invention may be designed such that the driver deflects the conduit at a position where the flow meter crosses the X-axis, substantially along the X-axis and perpendicular the line of flow through the flow meter conduit at the point of oscillation. The loops should have a curvature in excess of at least 180° and, preferably, in excess of 270°, and should also be symmetrical, both, in and out of this deflection point such that the oscillatory vibrations related to the fluid reaction forces are substantially equivalent. The measurement of the reaction forces will be measured with respect to their phase oscillation rather than their specific location. Therefore, the symmetrical nature of the conduit design is desired only to produce a uniform reaction force and spring constant relative to the fluid flow.

The present invention, may be embodied in other specific forms without departing from the spriit or essential attributes thereof and, accordingly, reference should be made to the appended claims, rather than to the foregoing specification, as indicating the scope of the invention.

I claim:

1. In a Coriolis mass flow meter of the type imparting an oscillation transverse to the direction of flow therein and having sensors located symmetrically with respect to and on opposite sides of the impartation of the oscillation and means for determining mass flow from the sensor signals due to the reaction of the flow in response to the imparted oscillation, comprising: a conduit having an inlet and an outlet rigidly fixed with respect to one another and a continuous flexible flow tube communicating with the inlet and the outlet at respective ends thereof, said flow tube formed symmetrically about a substantially straight line between the inlet and the outlet and substantially free of restrictions or constraints along its length offset from said straight line the flow tube having two successive loops, the first and second loop communicating with one another and adapted to direct the flow through the flow tube at the communication between said loops so as to cross the line between the inlet and the outlet substantially perpendicular thereto, the flow tube adjacent the inlet end having an inlet connecting portion adapted for deflecting the flow from the inlet to a position spaced from the line between the inlet and the outlet end directing the flow into the first loop, and an outlet connecting portion adapted to direct the flow from the second loop from a position spaced from the line between the inlet and the outlet and directing the flow into the outlet of the conduit.

2. In a Coriolis mass flow meter as claimed in 1 further comprising: means for oscillating said flow tube in a direction along the line between the inlet and the outlet of the conduit, said oscillating means positioned substantially at the crossing of the flow tube with the line between the inlet and the outlet and at the communication between said first loop and said second loop.

3. In a Coriolis mass flow meter as claimed in claim 2 wherein said oscillating means further comprises a coil winding and a bar magnet extending within said coil winding, said coil being subject to an oscillating current such that said bar magnet is alternately driven through said coil, said bar magnet attached to said flow tube at the crossing of the line between the inlet and the outlet of the conduit.

4. In a Coriolis mass flow meter conduit as claimed in claim 1 further comprising a second, substantially indential flow tube positioned adjacent to the first described flow tube, said inlet end of said conduit adapted to divide the flow entering the inlet end and feed equivalent flows into both said first and second flow tubes and said conduit outlet adapted to converge the flow from both said flow tubes into a single flow stream.

5. In a Coriolis mass flow meter as claimed in claim 1 wherein the inlet connecting portion and the outlet connecting portion are formed as part of said flow tube.

6. In a Coriolis mass flow meter as claimed in claim 1 wherein said first and second loops are formed in a single plane transverse to the line between the inlet and outlet ends of the conduit.

7. In a Coriolis mass flow meter as claimed in claim 1 wherein said first and second loops are formed in substantially parallel planes.

8. In a Coriolis mass flow meter as claimed in claim 1 wherein the first and second loops substantially form a FIG. "8" when viewed along the line between the inlet and outlet ends of the conduit.

9. In a Coriolis mass flow meter as claimed in claim 8 wherein the first and second loops are formed substantially in a single plane transverse to the line between inlet and outlet of the conduit.

10. In a Coriolis mass flow meter as claimed in claim 9 wherein the plane of said first and second loops is substantially perpendicular to the line between the inlet and outlet of the conduit.

11. In a Coriolis mass flow meter as claimed in claim 1 wherein the first and second loops form a "B" shape when viewed along the line between the inlet and outlet of the conduit.

12. In a Coriolis mass flow meter as claimed in claim 1 wherein said first and second loops further comprise an inlet arm portion, a first radial portion, a substantially linear central arm portion, a second radial portion and an outlet arm portion, the central arm portion forming the communication between the first and second loops, and the inlet arm portion and the outlet arm portion adapted to direct the flow substantially parallel to the flow within the central arm portion.

13. In a Coriolis mass flow meter of the type imparting an oscillation transverse to the direction of flow therein and having sensors located symmetrically with respect to and on opposite sides of the imparted oscillations and means for determining mass flow from the sensor signals due to the reaction of the flow in response to the imparted oscillation, comprising: a conduit having an inlet and outlet rigidly fixed with respect to one another and a continuous flow tube mounted between said inlet and outlet and being substantially free-floating from said mounting, said flow tube adapted to direct the flow through two successive loops, the communication between the two loops positioned along a substantially straight line formed between the inlet and the outlet of the conduit and substantially perpendicular thereto, the oscillation of the flow tube imparted in a direction substantially along a line between the inlet and outlet of the conduit.

14. In a Coriolis mass flow meter of the type receiving an imparted oscillation transverse to the flow therein and having sensors positioned on opposite sides of the imparted oscillation, the sensors producing signals representative of the reaction of the flow on opposite sides of the imparted oscillation, comprising: a conduit having an inlet and an outlet fixed with respect to one another, a continuous flow tube mounted at opposite ends to said inlet and said outlet and being substantially free-floating between said ends, said flow tube forming a B-shape when viewed along the line formed between the inlet and the outlet of the conduit, the B-shape adapted to directed the flow through two successive loops, whereby the flow being directed through said flow tube is in the same radial direction substantially through its length.

15. An apparatus for measuring the mass flow of a fluid moving through a defined fluid stream by measuring the Coriolis reaction forces of the fluid in response to an imparted oscillation, comprising: means defining a conduit having an inlet and an outlet, the inlet and the outlet defining a straight line between their respective positions, two substantially free floating loops connected to form a FIG. "8" design when viewed along the straight line, a first portion of said conduit means adapted to direct flow from said inlet to said first loop, a second portion adapted to direct flow from said second loop to said outlet, a central portion connecting said first loop and said second loop and passing through the straight line defined by the inlet and the outlet such that a fluid flowing through said central portion is directed substantially perpendicular to the straight line at said line passing; means imparting an oscillating deflection perpendicular to the central portion of said conduit means, said deflection means positioned substantially along the straight line; and means for individually sensing the movement of said first and second loops due to the reaction of the fluid in said conduit means to said deflection means, said sensing means positioned adjacent to the periphery of said first and second loops.

16. An apparatus as claimed in claim 15 wherein said sensing means comprises a piezo-electric transducer.

17. An apparatus as claimed in claim 16 wherein said transducer is mounted directly to said conduit means.

18. An apparatus as claimed in claim 15 wherein said sensing means is an accelarometer type sensor.

19. An apparatus as claimed in claim 15 wherein said deflection means is mounted on a bracket which is connected at its opposite ends adjacent to the inlet and the outlet of said conduit means.

* * * * *